United States Patent
Haimerl et al.

(10) Patent No.: US 8,052,623 B2
(45) Date of Patent: Nov. 8, 2011

(54) COMPUTER-ASSISTED JOINT ANALYSIS USING SURFACE PROJECTION

(75) Inventors: Martin Haimerl, Gilching (DE); Gregor Tuma, München (DE); Florian Schindler, Affoltern am Albis (CH); Marc Fricke, Feldkirchen (DE)

(73) Assignee: Brainlab AG, Feldkirchen (DE)

( * ) Notice: Subject to any disclaimer, the term of this patent is extended or adjusted under 35 U.S.C. 154(b) by 352 days.

(21) Appl. No.: 12/138,210

(22) Filed: Jun. 12, 2008

(65) Prior Publication Data
US 2008/0312663 A1 Dec. 18, 2008

Related U.S. Application Data

(60) Provisional application No. 60/951,287, filed on Jul. 23, 2007.

(30) Foreign Application Priority Data
Jun. 15, 2007 (EP) .................................. 07110355

(51) Int. Cl.
*A61B 5/103* (2006.01)
*A61B 5/117* (2006.01)

(52) U.S. Cl. ........................................ 600/595; 600/587

(58) Field of Classification Search .................. 600/587, 600/595; 702/1, 19, 128, 150–172
See application file for complete search history.

(56) References Cited

FOREIGN PATENT DOCUMENTS
WO WO 2004/010385 1/2004

OTHER PUBLICATIONS

Juntong Xi et al. "Shape analysis and parameterized modeling of hip joint", Sep. 2003, vol. 3, pp. 260-265, (XP009092401).
Jiamin Liu et al. "Model-based 3D Segmentation of the Bones of Joints in Medical Images", Medical Imaging 2005, Proc. Of SPIE vol. 5747 (SPIE, Bellingham, WA 2005) pp. 1793-1803, (XP007903546).
Siebert M. et al. "System for Three-Dimensional Biomechanical Analysis of Joints", Medical Imaging 2002: Physiology and Function from Multidimensional Images, Anne V. Clough, Chin-Tu Chen, Editors; Proc. Of SPIE vol. 4683 (2002); pp. 476-483, (XP007903548).

*Primary Examiner* — Jeffrey G Hoekstra
(74) *Attorney, Agent, or Firm* — Renner, Otto, Boisselle & Sklar, LLP

(57) ABSTRACT

A system and method for computer-assisted joint analysis, wherein the joint elements in a three-dimensional imaging data set are segmented and then projected onto a two-dimensional or three-dimensional reference area for interference analysis and surgical planning.

36 Claims, 4 Drawing Sheets

COMPUTER-ASSISTED JOINT ANALYSIS USING SURFACE PROJECTION

RELATED APPLICATION DATA

This application claims priority of U.S. Provisional Application No. 60/951,287 filed on Jul. 23, 2007, and EP 07 110 355.0 filed on Jun. 15, 2007, which are incorporated herein by reference in their entirety.

FIELD OF THE INVENTION

The invention relates to a system and method for computer-assisted joint analysis. Joint analysis includes many different joint determinations and evaluations including: detecting bone interferences in the joint; planning for joint treatment methods; and shape analysis for particular joint elements.

BACKGROUND OF THE INVENTION

To perform a computer-assisted joint analysis, volume image data sets (for example, CT, MR or x-ray volume image data sets) of the joint environment may be produced using a medical imaging method. The actual, three-dimensional contour and shape of joint elements (for example, bones) can be determined using computer-assisted image processing. If image data sets of the joint region are captured, then so-called segmenting may be used. If artificial joint elements are to be incorporated, corresponding three-dimensional imaging data also can be provided as known or predetermined joint element model data. For example, a computer-assisted-design ("CAD") model of an implant can be provided.

Interference detection analyses may be performed using the three-dimensional joint data obtained as noted above. Such analyses may be computationally elaborate and it may be difficult to visualize the result in an easily comprehensible form. In conventional joint analyses, the results are provided in three-dimensional form after the data sets have been processed. It may be difficult, however, to show where bone interferences will occur in particular joint positions. For treatments to correct the bone surfaces, specific features from the obtained three-dimensional image data can be used, however, this use may lead to imprecise surgery or incision planning. The interaction with the three-dimensional data in a computer-assisted joint analysis also may make the corresponding algorithms used relatively slow, unstable, and problematic with respect to the soft tissue structures in the joint region.

SUMMARY OF THE INVENTION

A method in accordance with the invention provides a computer-assisted joint analysis that produces results that are easy to visualize and enables robust, quick, and reliable data processing for many joint types. Such a method may include one or more of the following steps:

a) providing a three-dimensional imaging data set (for example, a volume image data set of the joint environment) produced using a medical imaging method;
b) identifying the joint elements in the data set using their shape (for example, using a computer-assisted image segmenting method);
c) determining or calculating a three-dimensional image of at least one joint element with computer assistance;
d) determining or selecting a reference area for the joint element;
e) projecting the three-dimensional image of the joint element onto the reference area using point position correspondences; and
f) outputting and/or storing the projected three-dimensional image of the joint element and other data for further evaluation.

In other words, the method in accordance with the invention reduces the processing problem for the obtained imaging data of the joint elements to the two-dimensional plane, namely by projecting the required imaging data onto the reference area. Once the characteristic data for the joint has been processed in this way, it is possible to ascertain particular deficiencies or states on the joint in a robust, quick and very generally valid way, by relatively simple observations of the projected images. Also, the two-dimensional nature of the resulting data facilitates visualizing the data, i.e., for visually outputting the data for those who are planning a treatment.

BRIEF DESCRIPTION OF THE DRAWINGS

The forgoing and other features of the invention are hereinafter discussed with reference to the figures.

DETAILED DESCRIPTION

The objects (the joint elements) processed in accordance with the invention can form a three-dimensional image or are configured such that a three-dimensional image can be produced. The three-dimensional image can be, for example, a surface model, a voxel model, or the like. In medical applications, the three-dimensional image can be produced by segmenting the relevant objects in a CT, MR, or x-ray volume data set. Alternatively, such three-dimensional images can be provided from particular types of three-dimensional models, for example from CAD models for known implants (or from body atlases or other) wherein the models can be adapted to the actual size.

A mathematical model of the joint motion helps in calculating idealized motion surfaces that can be used to calculate critical regions. Idealized motion surfaces can be calculated for each individual object. The idealized motion surfaces also can be referred to herein as "border areas," since they represent the border lines that should not be exceeded by the objects or joint elements. The idealized motion surfaces may depend on the respective motion model. The idealized surface for a ball joint may be, for example, represented by a sphere that has the center point and radius of the ball of the joint. Such spherical surfaces, or any other idealized motion surfaces or border areas, can be interactively defined or automatically calculated, for example, by inscribing a spherical area in a joint head, a joint socket, or in between the two. Any structure that exceeds such a border area, for example, the spherical area, can be categorized as a critical region. The concavity or convexity of the objects may be considered. For the ball side of a hip joint (the femoral side), for example, the outer parts are relevant, while for the socket side (the acetabulum), the inner parts are relevant. The critical regions can be equally defined by any manual or automatic procedure, and the rim points and/or the inner part of the joint socket (which is limited by the rim points) can, for example, be used as a critical region. The rim points can be automatically detected or interactively defined.

Figure 1:
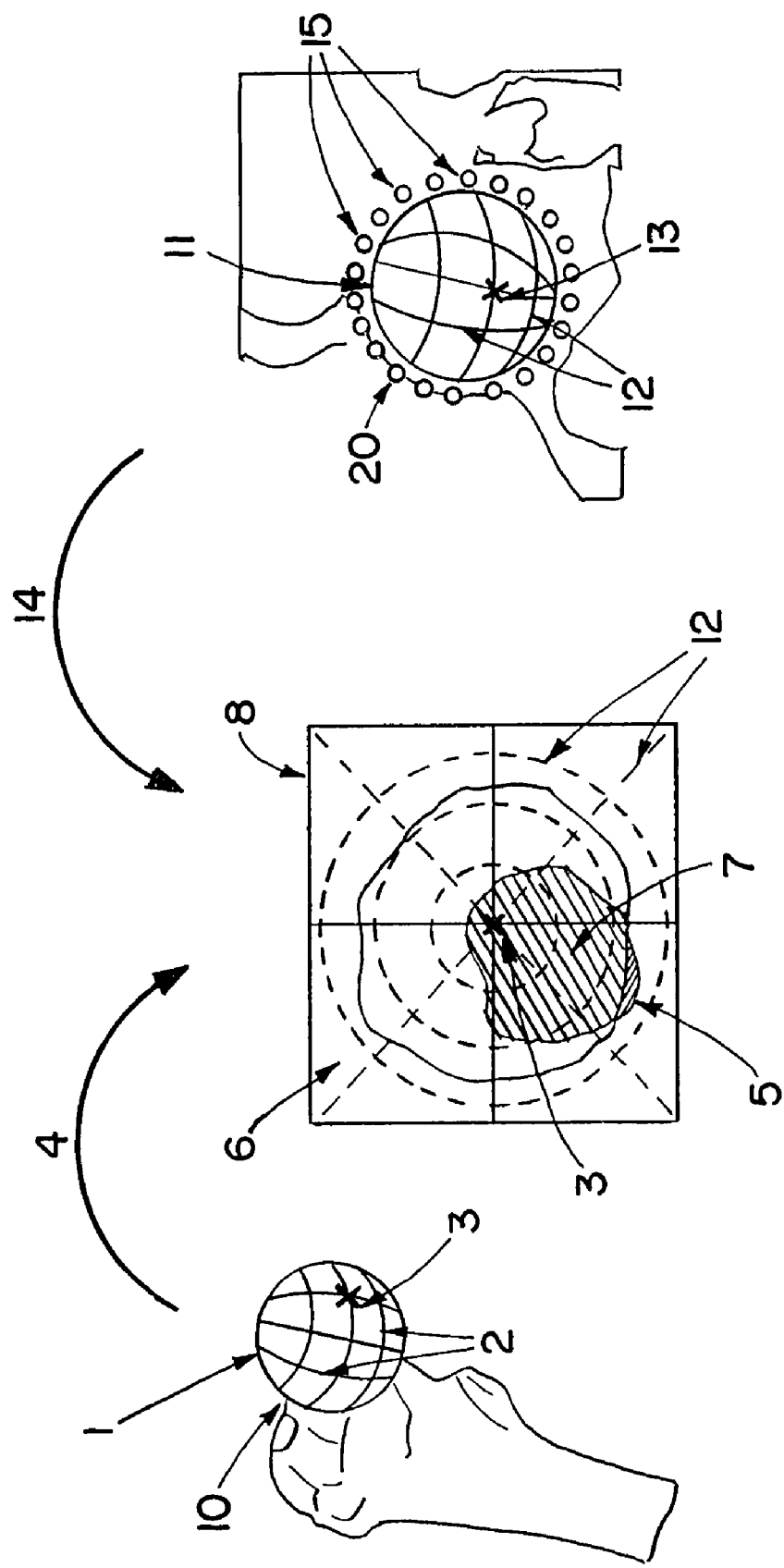
FIG. 1 illustrates an exemplary scheme for using a method in accordance with the invention in projection-based interference detection for a hip joint.
Figure 2:
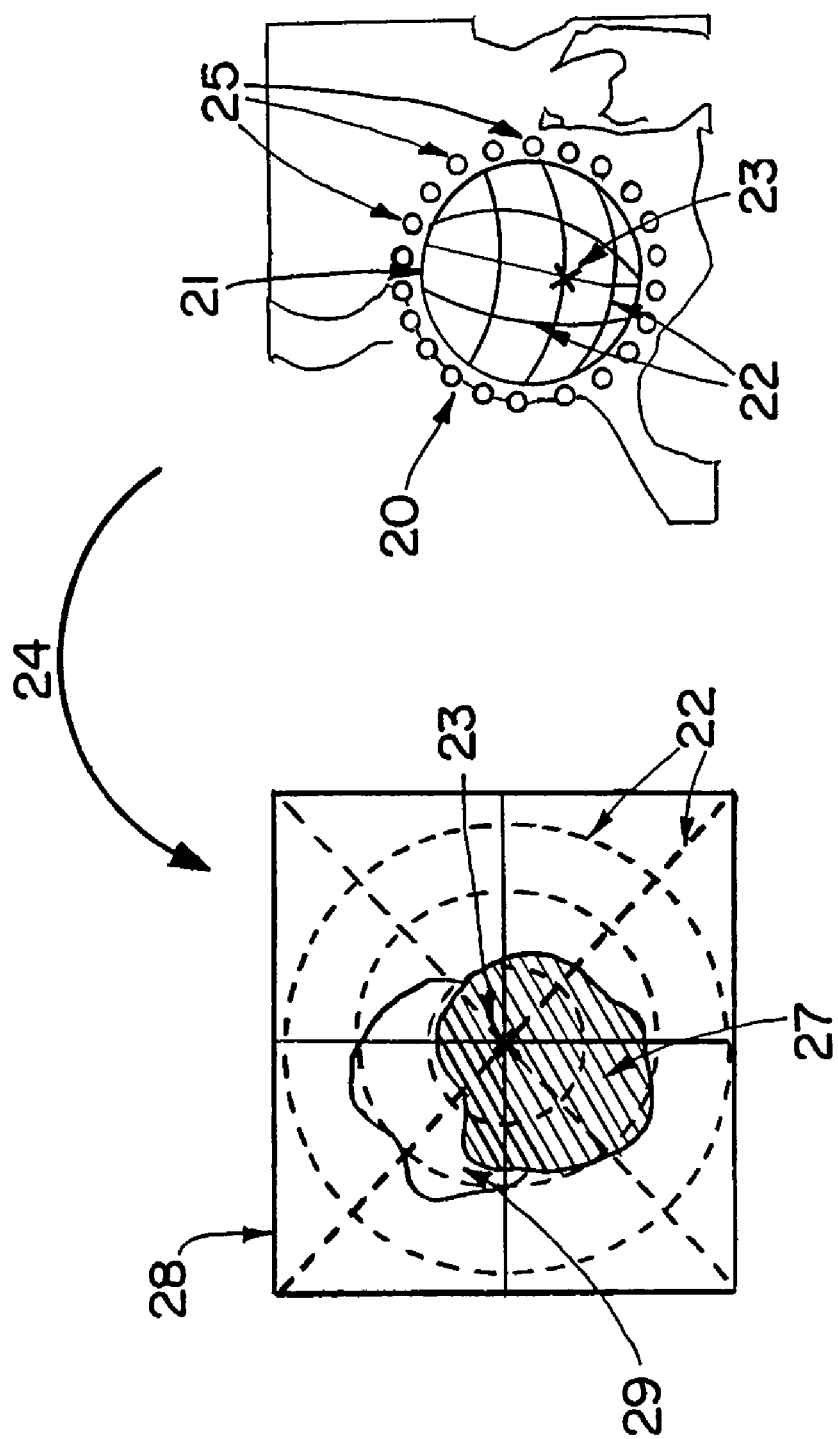
FIGS. 2 and 3 illustrate an exemplary scheme for using a method in accordance with the invention in the shape analysis of joint elements in a hip joint.
Figure 3:
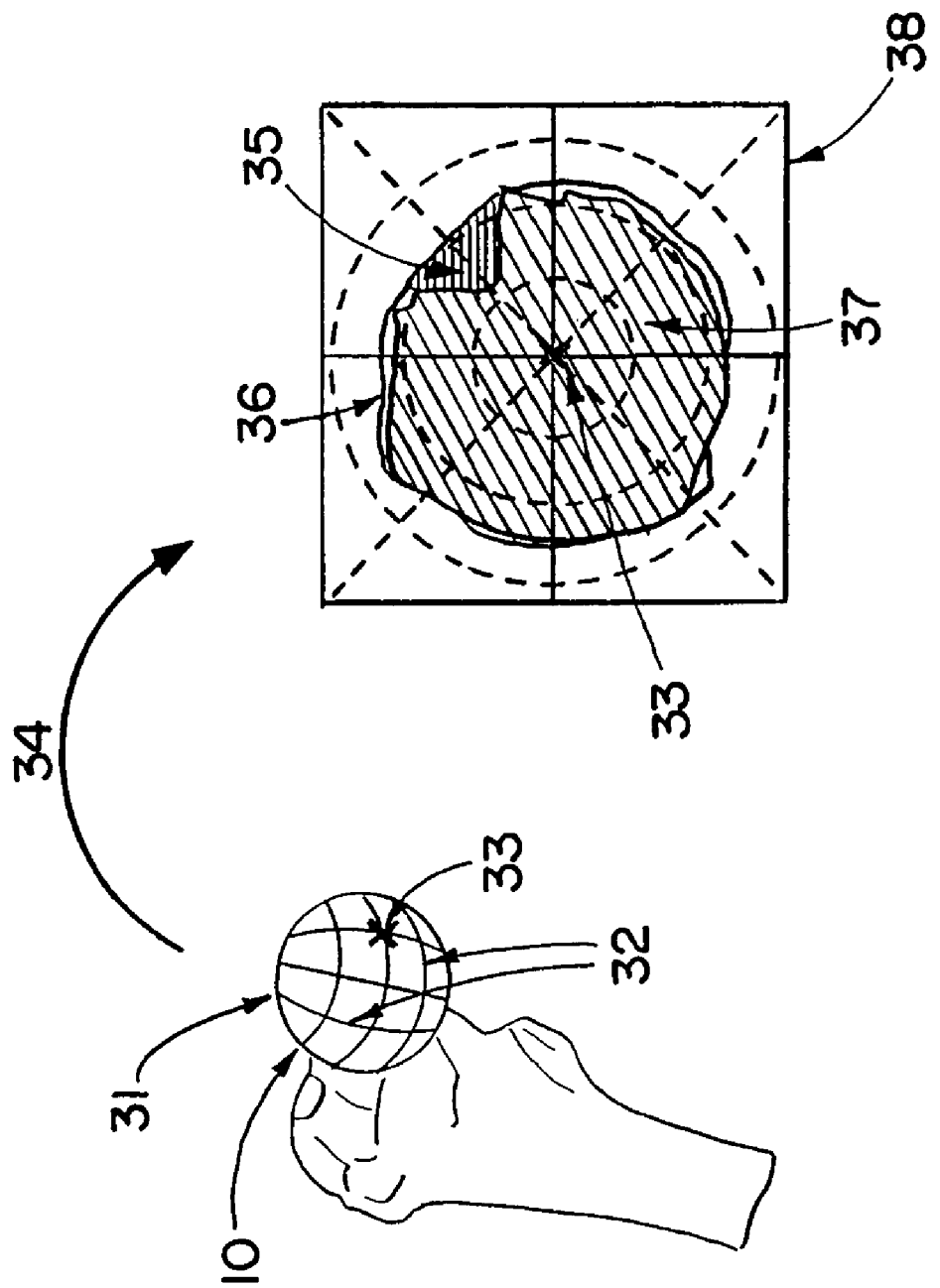

Examples of inscribing such spherical border areas are shown in FIGS. 1-3. Shown in these figures are inscribed spheres 1, 11, 21, and 31 that are respectively shown for joint head 10 and joint socket 20. The use of these inscribed spheres (border areas) is discussed in greater detail below in the discussion of variants and/or applications.

A reference area onto which a three-dimensional image of at least one joint element is projected within the framework of the invention can be any surface that allows such a projection. In FIGS. 1-3, three reference areas are indicated by reference numbers 8, 28 and 38, respectively. These reference areas 8, 28, and 38 will be discussed in more detail below. The projection used may take into account the correspondence of point positions of the objects that are involved in the process. For each observed position of the joint, the objects involved are projected onto a reference area or surface. The reference area or surface can be individually recalculated or selected for each position of the joint. The projection method can be any method that transfers the object surfaces or parts of the object surfaces onto the reference area.

As an example, the following transference or transformation can be used. Corresponding reference points and directions are defined on each of the object surfaces and on the reference surface. A surface distance and direction with respect to the reference point is calculated for each point on the object surface. The same distance and direction are used to determine the corresponding point on the reference surface.

The border area selected or determined should be close to all joint objects. The points of the objects can be projected onto this area or surface. A three-dimensional distance to the surface (i.e., the distance between the original and projected point) now may be the depth or depth value of this point. In one exemplary embodiment, the depth or depth value of a point on the femoral head/acetabulum is the distance from this point to the selected sphere (i.e., border area). This depth value information can be used for three-dimensional interference detection or for judging the reliability and/or severity of interferences. Depth information, for example, the distance between the object and a common intermediate area or specific idealized motion area or border area, once calculated can be transferred onto the reference area.

Different methods may be used for calculating the distance between the object points and the corresponding points on the border area. The distance need not be a Euclidean distance nor does it need to be a standard projection in Euclidean space. Any projection and any distance calculation may be used.

FIG. 1 shows this method as applied to a hip joint, wherein a pair of projections are indicated as arrows bearing the reference sign 4 for the joint head and 14 for the joint socket. Reference sign 1 indicates a border area or idealized motion area as a sphere 1 around a joint head 10 of a femoral bone. FIG. 1 also shows coordinate lines 2 on the sphere 1 and corresponding reference points 3 on the common reference area 8 and the sphere 1. A border area 11, coordinate lines 12 and a reference point 13 for the acetabulum 20 are correspondingly indicated on the right-hand side of FIG. 1. FIG. 1 also includes a set of hip joint rim points 15.

In the projection onto the common reference surface or reference area 8, shown in the middle in FIG. 1, a critical femoral region 6 and a critical joint socket region 7 are shown. An impingement, interference, or overlap region 5 between these regions is also indicated. Detecting and utilizing this region within the framework of the invention is discussed in more detail below.

The current position of the hip joint (the relative orientation of the femoral bone and the pelvis) is taken into account in the calculations for the projection transformation, which means that the reference points and reference directions may be transformed or transferred accordingly.

Alternatively, a spherical shape that lies between the motion surfaces of the femoral head and the joint socket could be used as the reference surface. In this case, a projection using the shortest distances can be used, and another projection onto a flat plane may be helpful. For the situation shown in FIG. 1, the projection onto an intermediate sphere can be used to ensure correct point correspondences.

Interference Detection

One application for the method in accordance with the invention is projection-based interference detection. In general, interference detection analyses seek to ascertain whether two or more objects that are defined in three-dimensional space interfere with each other (i.e., whether they exhibit a non-zero intersection). This interference detection is usually performed using standard intersection calculations in three-dimensional space. These calculations can be optimized using adapted strategies for accessing the volume data.

In a method in accordance with the invention, however, three-dimensional imaging data (specifically, the volume data) is projected onto a specified two-dimensional reference area, and an intersection calculation is performed on a two-dimensional plane. (Additional depth information may be used.) An interference is detected if there is an overlap between the projected volumes on the two-dimensional plane (and comparing the depth information likewise reveals an overlap).

In anatomical joints (for example, human joints such as the hip joint) soft intermediate tissues prevent wear of the structures involved. When the soft intermediate tissue is compressed by a reduction in the bone distance in the rim region of the joint, joint motion is affected. Such soft tissue compression should likewise be considered as an interference or impingement. Using a method in accordance with the invention, it is possible to detect this interference. The parts of the joint should be considered to interfere when they exceed an idealized motion surface or border area.

As described herein, this method can be demonstrated using the example of a hip joint. The hip joint can be approximated as a spherical joint, and assuming idealized curved surfaces, the following structures may be relevant to detecting interferences or impingements. For the femur (the convex component of the joint), the relevant structures are those that exceed a spherical shape that is adapted to the joint head or femoral head. For the pelvis, the rim of the joint socket where the bone structures depart from the spherical shape is relevant.

The diameters of the spherical shapes involved differ at least by the thickness of the soft tissue lying between them (for example, the labrum or cartilage structures). The relevant structures can be projected onto a common reference area, and an impingement or interference is ascertained if there is an overlap between the projected surface parts of the femur and the projected rim of the joint socket. Such an instance is shown in FIG. 1, in which in the middle projection (the common reference area), a portion 5 is marked in a dark color. Portion 5 is the overlapping portion. (The depth is not taken into account in this case. It can, however, be used as an indicator for the severity of the interference.)

For other joints, other idealized motion surfaces or border areas may be relevant. For example, a cylindrical surface can be used for a knee joint. The method in accordance with the invention may be suitable for planning treatments for correcting the knee joint bone surfaces. It is possible to detect, for each position of the joint, which parts of the bones involved have to be ablated to obtain the desired configuration. The invention can equally be used to analyze the range of motion in the case of total hip replacement and/or for analyzing implants.

Existing interference detection methods only consider direct contact between bone structures, intermediate tissue is not taken into account. This assumption may lead to an overestimation of the present range of motion or the range of motion to be expected after treatment. Because the method in accordance with the invention is reduced to two-dimensional calculations, interference detection in accordance with the invention is more efficient as compared to such conventional approaches. In addition, it is more robust with respect to its computational procedures, especially regarding the imprecise alignment of elements of the joint. If, for example, the center of the femoral head does not exactly match the center of the acetabulum, conventional approaches may yield incorrect results. In particular, a number of incorrectly detected interferences can occur if the objects are very near to each other. Due to small irregularities in the segmented bone surfaces, changes in the joint position can lead to many intermediate interferences. The method in accordance with the invention can detect any structural deviations for each part of the joint separately, and thus, misalignments do not directly affect the results. Irregularities in object surface also do not affect the results to such a large extent. The reliability of a detected interference can be categorized by using depth information, as is discussed in more detail in the description of the next variant and application of the invention.

A procedure for an interference application such as has been described may include:
1. Calculate three-dimensional images of the objects involved (imaging methods plus segmentation).
2. Optionally: Calculate critical regions (regions in which the objects depart from their idealized motion surfaces or border areas).
3. For each joint configuration or joint position considered, perform steps 4-6.
4. Calculate three-dimensional images of all the individual objects (joint elements, CAD models, segmentation data, etc.).
5. Project the objects onto a reference area or surface.
6. Calculate any overlaps of the projected objects on the reference area or surface and, in some cases, compare depth values.

Steps 4 to 6 can be repeated or iterated for each joint position and/or joint configuration.

Projection-Based Planning/Visualization

Another application of the method in accordance with the invention is that of planning joint surgeries using the projection views. The projection views provide a tool for visualizing the functionality and the deficiencies of a joint. In conventional three-dimensional images of the joint elements and/or joint bones, it may be difficult to visualize where bone interferences will occur and/or their severity.

The range of motion of a joint can be impaired due to bone anomalies that can lead to increased wear of the joint (bone or soft tissue) and consequently to arthritis. Early surgical intervention can help to correct such anomalies. The method in accordance with the invention can be used to plan and assist in such operations, for checking the joint functionality, and for optimizing implant positions.

To this end, one example of using the invention allows visualization of the functionality of the joint by projecting depth information (of the critical regions) for the objects involved onto a reference area. In this reference area, for each point on the curved surfaces of the objects involved, depth values are calculated and transferred onto the reference area. The projection accounts for the correspondence of point positions of the objects in question (joint elements, as has been explained above). A conflict (for example, an overlap) of the depth values indicates a potential interference or impingement between the joint elements. The position of the interference can be clarified by displaying a suitable coordinate system on the reference area. The severity, frequency, and/or reliability of such interferences can be highlighted using depth values (for example, by color coding).

There are various ways of calculating depth values (for example, distances from an intermediate motion surface, such as, a sphere lying between the elements of a ball joint). And there are various ways of calculating distances from an idealized motion surface (for example, a sphere on an element of a ball joint). In each variation, the motion surfaces or border areas can be individually calculated for each object in question. If the depth values, for example, represent the distances from a common reference area, then an interference is ascertained whenever the depths overlap at some point. If the depth values represent the distance from the idealized motion surface or border area, an interference is ascertained whenever the depths exceed a critical value. In this instance, the depth information can be used to describe the frequency, reliability, or severity of the detected interference.

As already mentioned, the depth values can be color coded in order to visualize the frequency, reliability, or severity of the interference. Each individual joint element involved, or all the joint elements involved, can be used to rate interferences. Based on the results, the planning of an incision can be manipulated (interactively or automatically), and the critical regions of the joint motion, landmarks, or resection volumes can be defined or adjusted. The position of implants can be optimized, and parts of the objects can be virtually removed (for example, for planning hip joint surgery) and/or translated or rotated (for example, for planning osteotomy surgery). A new position of the joint can be selected, and the process can be iterated to improve or refine planning. Also, the new joint position can be iteratively or automatically selected. The position of implants can be planned, checked, and adjusted, and all of these processes can be virtually simulated and checked. The detection of interferences is made more robust by the use of different methods for depth calculation, for example, by separately calculating the distances from an idealized motion surface for each object involved. In one example, compression of an intermediate soft tissue or a cartilage can be categorized as an interference. Because interference detection is not as dependent on the availability of a perfectly concentric joint, deformed joints or imprecision in the joint parameters captured (for example, the center of rotation) do not affect the results as significantly as in conventional methods, in which many incorrectly detected intermediate interferences can occur.

In accordance with this aspect, the method in accordance with the invention thus provides a tool that, with the aid of a highly advantageous visualization, shows the regions and joint positions in which interferences will occur. It is possible to perform a detailed analysis of the functionality of the joint and to plan an incision, and to optimize said functionality. In such cases, the operation can be a total hip replacement or other operation such as surface adapting or a partial reshaping of the joint (wherein the range of motion (ROM) can also be optimized).

A method sequence for the application just described (interference detection; visualization; incision planning) can include the following:

1. Calculate three-dimensional images of the objects involved (imaging methods plus segmentation).
2. Optionally: Calculate critical regions (regions in which the objects depart from their idealized motion surfaces or border areas).
3. For each joint configuration or joint position considered, perform steps 4-8.
4. Calculate three-dimensional images of all the individual objects (joint elements, CAD models, segmentation data, etc.).
5. Project the objects and depth values onto a reference area or surface.
6. Visualize overlaps of the projected objects on the reference area (for example, by color coding critical depth values).
7. Store, analyze, or manipulate the data for further planning or optimizing (possibly using additional information or visualizations).
8. Optionally: Manipulate the planning data, based on the data and results.

Steps 4 to 8 can be repeated or iterated for each joint position and/or joint configuration.

Projection-Based Shape Analysis

Another aspect and/or application of the method in accordance with the invention is projection-based shape analysis for curved surfaces of joints, which also may be used in correcting or repositioning joint elements.

Conventional techniques for correcting or repositioning parts of a joint only use specific three-dimensional features of the relevant bones (for example, a plane which approximates the joint socket plane for pelvic osteotomies). For hip joint incisions, there have been attempts to detect virtual ranges of motion, to ascertain abnormalities in the bone functionality. These approaches, however, regard the whole joint as a single object. The approaches cannot distinguish which joint element is responsible for the abnormal functionality.

Using the projection-based joint analysis described above, however, it is possible to perform a shape analysis on the two-dimensional plane. Different shape modeling techniques (for example, statistical shape models, PDMs, geometric features, Fourier descriptors, etc.) can be used to represent and analyze the shapes. Standardized shapes can be calculated and individual shapes can be compared using these standardized shapes. For comparing the shapes, it is possible to register the shapes to align them with respect to each other (for example, by calculating an optimum alignment for an osteotomy or a pre-alignment to make further detailed comparisons of the shapes). In addition, local deformations in the shapes or calculations of geometric differences in shape, can be used to compare the shapes in detail. It is possible to use the detected differences to define regions for bone removal, and the significance of particular regions can be categorized using depth values or differences in shape. Hence, it can be decided what parts of what joints have to be removed. The values obtained can likewise be used to weight the alignment process or to calculate specific reference positions in the objects.

FIG. 2 shows an example of a projection 24 in accordance with the invention, such as is used in a shape analysis, wherein an incorrect alignment can be seen. After the projection 24, which can be created as described in detail above, transferred coordinate lines 22 and transferred reference point 23 (also a reference shape 29 and an individual, incorrectly aligned shape 27) are visible in the reference area 28. The nature and severity of the misalignment can thus be seen from the representation using the reference area 28. Hip joint rim points 25 are illustrated in the right frame of FIG. 2.

FIG. 3 shows an example of ascertaining differences in shape. Here, coordinate lines 32 and a reference point 33 are transferred onto a reference area 38 by a projection 34. A critical region 36 of a standard femoral head, and a critical region 37 of the individual, deficient femoral head, can be seen projected on the reference area 38. The substantial difference in shape between the individual femoral head and the standard femoral head is indicated and visualized in a highlighted region 35.

The features calculated by the shape analysis may be used to categorize normal situations and disease patterns. It is possible to decide, using a comparative basis, on a specific incision or to plan said incision. The features obtained can be further processed or classified, by signal processing, pattern analysis, and/or pattern assignment methods.

A shape analysis in accordance with the invention can be one-sided (for example, for calculating the alignment of the acetabulum) or two-sided (for example, for comparing interference regions resulting from incorrect bone contact in a particular joint position). The coordinate systems for the projection surfaces also can be taken into account individually or in combination. For example, it is usually sufficient for a pelvic osteotomy to analyze the misalignment of the acetabulum relative to the rim of the joint socket. For other purposes, the relative position of the femoral head in the acetabulum in different positions of the joint may be relevant. The current range of motion and the range of motion that may be obtained can likewise be analyzed within this framework, and it is possible to analyze the differences in shape depending on the joint position or joint configuration.

The method in accordance with the invention enables all the data in the projection views to be visualized. As in the previously described aspect of the invention, depth values can be color coded to visualize the frequency, reliability, and/or severity of interferences. All the other proposed measures that have been explained in detail above also can be performed, such as calculating all the objects or an individual object, improving or manipulating incision planning, defining critical regions, optimizing implant positions, virtually removing, translating, or rotating object parts, and interactively or automatically selecting new joint configurations or new joint positions.

In accordance with this aspect of the method in accordance with the invention (shape analysis), more complete and more precise correction planning or repositioning planning is enabled, the necessary correction or repositioning can be automatically calculated and optimized, and differences between a standardized model and the individual situation also can be visualized. It is possible to automatically detect whether the main part of the bone abnormality is situated on one or another joint element (the femur or the pelvis) or on both sides. Automatic planning can be performed that defines all the parts on the respective joint element, for example, the femur or the pelvis, that have to be removed.

In general terms, it is possible to automatically provide an aid in ascertaining the type of deficiency or abnormality of a joint. Based on this information, a decision regarding the optimum incision can be made more easily.

An exemplary method sequence in accordance with this aspect of the invention (shape analysis) may include the following:

1. Calculate three-dimensional images of the objects involved (imaging methods plus segmentation).
2. Optionally: Calculate critical regions (regions in which the objects depart from their idealized motion surfaces or border areas).
3. For each joint configuration or joint position considered, perform steps 4-7.
4. Calculate three-dimensional images of all the individual objects (joint elements, CAD models, segmentation data, etc.).
5. Project the objects onto a reference area or surface.
6. Calculate shape parameters.
7. Compare and/or classify the shape parameters.

Steps 4 to 7 can be repeated or iterated for each joint position and/or joint configuration.

Figure 4:
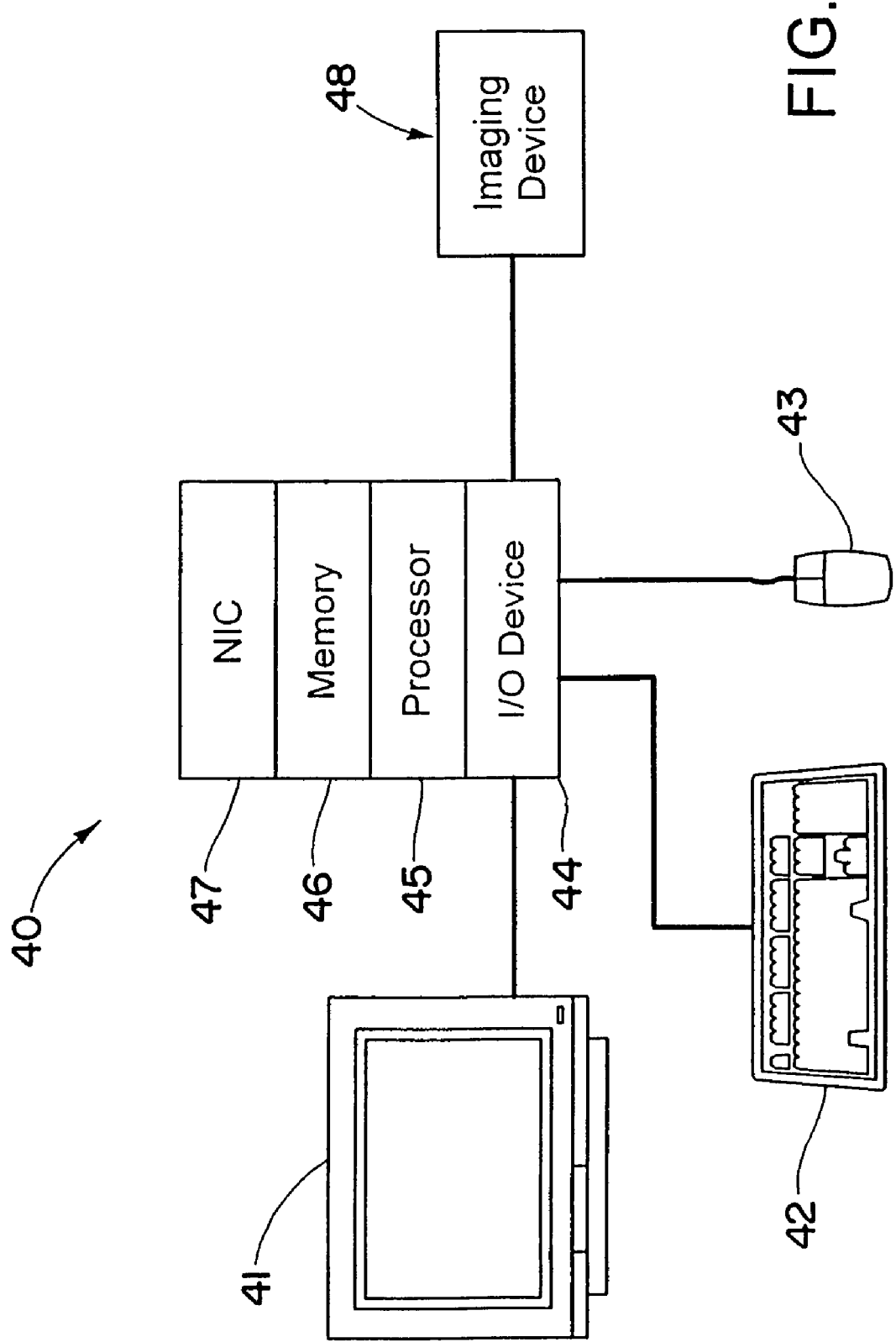
FIG. 4 illustrates a block diagram of an exemplary computer that may be used to implement one or more of the methods described herein.

Moving now to FIG. 4 there is shown a block diagram of an exemplary computer 40 that may be used to implement one or more of the methods described herein. The computer 40 may be a standalone computer, or it may be part of a medical navigation system, for example. The computer 40 may include a display or monitor 41 for viewing system information, and a keyboard 42 and pointing device 43 for data entry, screen navigation, etc. Examples of a pointing device 43 include a computer mouse or other device that points to or otherwise identifies a location, action, etc., e.g., by a point and click method or some other method. Alternatively, a touch screen (not shown) may be used in place of the keyboard 42 and pointing device 43. The display 41, keyboard 42 and mouse 43 communicate with a processor via an input/output device 44, such as a video card and/or serial port (e.g., a USB port or the like).

A processor 45, such as an AMD Athlon 64® processor or an Intel Pentium IV® processor, combined with a memory 46 execute programs to perform various functions, such as data entry, numerical calculations, screen display, system setup, etc. The memory 46 may comprise several devices, including volatile and non-volatile memory components. Accordingly, the memory 46 may include, for example, random access memory (RAM), read-only memory (ROM), hard disks, floppy disks, optical disks (e.g., CDs and DVDs), tapes, flash devices and/or other memory components, plus associated drives, players and/or readers for the memory devices. The processor 45 and the memory 46 are coupled using a local interface (not shown). The local interface may be, for example, a data bus with accompanying control bus, a network, or other subsystem.

The memory may form part of a storage medium for storing information, such as application data, screen information, programs, etc., part of which may be in the form of a database. The storage medium may be a hard drive, for example, or any other storage means that can retain data, including other magnetic and/or optical storage devices. A network interface card (NIC) 47 allows the computer 40 to communicate with other devices. The computer 40 may operative coupled to an imaging device 48 to receive an imaging data set.

A person having ordinary skill in the art of computer programming and applications of programming for computer systems would be able in view of the description provided herein to program a computer system 40 to operate and to carry out the functions described herein. Accordingly, details as to the specific programming code have been omitted for the sake of brevity. Also, while software in the memory 46 or in some other memory of the computer and/or server may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed Figures. In particular regard to the various functions performed by the above described elements (components, assemblies, devices, software, computer programs, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for computer-assisted joint analysis, comprising:
   a) providing a three-dimensional image data set of a joint;
   b) performing a computer-assisted segmentation of the data set to identify a shape of at least two joint elements in the data set;
   c) calculating, with computer assistance, a three-dimensional image of at least one joint element of the at least two joint elements;
   d) determining or selecting a reference area for the at least one joint element of the at least two joint elements;

e) projecting the three-dimensional image of the at least one joint element onto the reference area using point position correspondence, said point position correspondence comprising defining at least one reference point and direction on a surface of the at least one joint element and on the reference area, calculating a surface distance and direction with respect to the at least one reference point for each point on the at least one joint element, and using the calculated surface distance and direction to determine a corresponding point on the reference area; and f) outputting and/or storing the projected three-dimensional image.

2. The method according to claim 1, wherein steps (c) to (f) are performed iteratively for different joint positions.

3. The method according to claim 1, further comprising re-determining the reference area for a new joint position.

4. The method according to claim 1, wherein the reference area is a three-dimensional area that can be assigned to the at least one joint element.

5. The method according to claim 1, wherein the reference area is a common reference area for at least two joint elements.

6. The method according to claim 1, wherein the reference area is a three-dimensional area that lies between surfaces of at least two joint elements that determine joint motion.

7. The method according to claim 1, wherein the three-dimensional image of the at least one joint element is converted to two dimensions for outputting an image rendition onto a plane area.

8. The method according to claim 1, further comprising ascertaining and evaluating depth information for different joint positions.

9. The method according to claim 1, further comprising interactively or automatically manipulating graphic representations of the projected joint element image(s).

10. The method according to claim 1, wherein
the joint is a hip joint;
the joint elements are a femoral head, an acetabulum or an implant configured to replace the femoral head and/or the acetabulum; and
the reference area and/or a border area are spherical.

11. The method according to claim 1, wherein
the joint is a knee joint;
the joint elements are a distal femoral head, a proximal tibial head or an implant configured to replace the distal femur head and/or the proximal tibial head; and
the reference area and/or a border area are cylindrical.

12. The method according to claim 1, further comprising reconstructing three-dimensional volumes for critical joint elements or joint regions from the projected joint element image(s).

13. The method according to claim 1, further comprising performing virtual processing of data pertaining to the at least two joint elements to estimate the consequences of possible joint element alteration.

14. The method according to claim 1, further comprising automatically assigning the projected joint element image to a shape model selected from a predetermined set of models.

15. The method according to claim 1, further comprising transferring onto the projection of the joint element image, depth information for point positions on a joint element.

16. The method according to claim 15, wherein the depth information includes a depth value, wherein the depth value includes the distance of joint element surface points from the reference area or from a border area.

17. The method according to claim 16, wherein the depth information is utilized in interference detection, further comprising:
ascertaining an interference when depth values for two joint elements overlap; or
ascertaining an interference when a depth value exceeds a critical value,
wherein the frequency and severity of the interference is deduced from the size of the depth value.

18. The method according to claim 1, further comprising graphically highlighting interference locations or interference zones in a graphic output of the projection of the joint element image.

19. The method according to 18, wherein the interference locations or interference zones are marked in color, colored differently depending on the frequency or severity of the interference, or otherwise specifically marked.

20. The method according to claim 1, further comprising superimposing the projection of the joint element image with a corresponding projection of a shape model.

21. The method according to claim 20, wherein the shape model is a standardized joint element model or a model having a known disease characteristic.

22. The method according to claim 20, further comprising registering the shape model and the projection of the joint element image to obtain a reciprocal alignment or show a desired alignment.

23. The method according to claim 20, further comprising performing a shape analysis for the joint element using two-dimensional projections of the joint element and the shape model.

24. The method according to claim 20, wherein the ascertained depth information is used in the shape analysis.

25. The method according claim 23, further comprising determining, based on the two dimensional projections, overlap zones of projected joint elements as interference location(s) or interference zones for a respective joint position.

26. The method according to claim 25, wherein the interference zones are indicated in an output of the projection.

27. The method according to claim 25, further comprising inscribing a coordinate system into the reference area to ascertain an actual position of the interference location(s) or interference zone(s).

28. The method according to claim 25, further comprising storing, analyzing, or manipulating ascertained data concerning the interference location(s) or interference zone(s) to be provided as planning data for medical navigation assistance or as evaluation data for a range-of-motion analysis.

29. The method according claim 1, further comprising determining, with computer assistance, a three-dimensional border area that can be assigned to at least one joint element.

30. The method according to claim 29, wherein performing the computer-assisted segmentation of the data set provides a segmented three-dimensional imaging data set, the three-dimensional border area is determined from image data of the segmented three-dimensional imaging data set.

31. The method according to claim 29, wherein the three-dimensional border area is determined from adapted body atlas data and/or available contour data for implants.

32. The method according to claim 29, further comprising determining deviations from the three-dimensional border area and identifying these deviations as critical regions for the respective joint element.

33. The method according to claim 29, wherein critical regions are ascertained using segmentation methods or optimization methods, by taking into account ancillary conditions.

34. The method according to claim 33, wherein the ancillary conditions include one or more of the following:
 a smoothness of border contours,
 a rating of particular regions, and
 a distance from standard values for the position of critical regions.

35. The method according to claim 1, wherein using point position correspondence includes using corresponding reference points defined on the reference area and at least one joint element.

36. The method according to claim 35, wherein using corresponding reference points defined on the reference area and at least one joint element includes transferring at least part of the joint element surface onto the reference area.

* * * * *